United States Patent [19]
Best

[11] 3,894,757
[45] July 15, 1975

[54] BRANCH PIPE CONNECTION FITTING

[75] Inventor: Samuel J. Best, West Chester, Pa.

[73] Assignee: Allied Piping Products Company, Inc., Norristown, Pa.

[22] Filed: June 10, 1974

[21] Appl. No.: 477,963

[52] U.S. Cl. ................................. 285/189; 285/286
[51] Int. Cl.² ........................................ F16L 13/02
[58] Field of Search .................. 285/286, 189, 158; 403/272

[56] References Cited
UNITED STATES PATENTS

| | | | |
|---|---|---|---|
| 1,966,403 | 7/1934 | Durham | 285/156 X |
| 3,392,994 | 7/1968 | Moore | 285/286 X |
| 3,516,692 | 6/1970 | Albrecht | 285/177 X |

OTHER PUBLICATIONS

Design Standards for Steel Water Pipe by Russell E. Barnard, Copyright 1948, pages 63, 66 and 67.

Primary Examiner—Thomas F. Callaghan
Attorney, Agent, or Firm—Smith, Harding, Earley & Follmer

[57] ABSTRACT

A cylindrical branch pipe connection fitting has one end adapted to be welded to a substantially round main pipe at a branch orifice in said main pipe and the other end adapted to be connected to a branch pipe. The fitting has a wall thickness which is equal to or greater than the wall thickness of a branch pipe of the same nominal size as the fitting. Said one end of the fitting is contoured to engage the main pipe adjacent the periphery of the branch orifice and has a first beveled face at an angle of from about 30° to about 50° extending across a thickness of the fitting equal to from about 75% to about 125% of the wall thickness of a branch pipe of the same nominal size as the fitting and a second beveled face at an angle of from about 50° to about 75° extending outwardly from the first beveled face to the outer periphery of the fitting. The second beveled face will be at an angle at least 15° greater than the first beveled face.

3 Claims, 4 Drawing Figures

BRANCH PIPE CONNECTION FITTING

BACKGROUND OF THE INVENTION

It is well known to design branch pipe connection fittings to provide sufficient cross section in the joint to withstand the combined hoop stresses of the main pipe and the branch pipe fitting when the fitting is welded to the main pipe. Typically, the increased cross section is calculated to reinforce the joint to withstand a working pressure which is 100% of the main pipe. This provides a strength which is frequently unnecessary in many applications, since pipe is manufactured to nominal sizes and nominal thicknesses which are standard from manufacturer to manufacturer in accordance with the standards of the American National Standards Institute. Hence, while the wall thickness provides necessary strength for some applications, it provides excessive strength for many other applications. Where the full strength is not required, the use of a full strength branch pipe connection fitting is an unnecessary expense because of the excessive amount of weld required for installation. Nor is it satisfactory to simply cut down on the amount of the weld deposited in the usual fitting employing a single bevel since this necessarily leaves a notch or sharp angle between the weld and the fitting which greatly intensifies the stress in the joint. This invention solves this problem. In addition the invention provides accurate means for determining the necessary weld volume to reinforce the joint for dual pressures, one pressure rating determined by the first beveled face and the other by the second beveled face.

The prior art recognized that the severest stresses occur in the area of the crotches of a branch connection fitting. An attempt to take care of this situation is found in Durham U.S. Pat. No. 1,966,403 which teaches using a greater cross section at the crotches than at the ears in order to resist the intensification of stresses at the crotch areas to prevent rupture of the fitting. This approach requires a large volume of weld to be deposited in the crotch areas of the fitting. Rather than using the tapered construction from a fixed plane as in Durham, this invention employs a beveled configuration which provides for the employment of a greater thickness of metal in a given fitting in the areas of the ears of the fitting which resists the transmission of stresses into the crotch area and hence permits the employment of less weld in the crotch areas. The use of two bevels as herein provides a cantilever beam which is uniform as measured from the contoured end of the fitting. Surprisingly, a fitting of this invention having the same maximum wall thickness as a Durham fitting has as much strength as a Durham fitting while requiring about 60% less weld volume. On the other hand, if the weld is increased so as to be deposited also on the second bevel, the strength of the fitting will be markedly increased as against the employment of a single bevel throughout, the increase being sufficiently great to permit the use of the fitting with a branch pipe of the next heavier rating (ANSI schedule).

BRIEF SUMMARY OF THE INVENTION

A cylindrical branch pipe connection fitting has one end adapted to be welded to a substantially round main pipe at a branch orifice in said main pipe and the other end adapted to be connected to a branch pipe. The fitting has a wall thickness which is at least equal to the wall thickness of a branch pipe of the same nominal size as the fitting. The term wall thickness as used in reference to the invention refers to the greatest thickness of the wall of the fitting in question (see FIG. 3). Advantageously the wall thickness of the fitting will be from 100% to about 300% of the nominal wall thickness of a branch pipe of a nominal size which is the same as the nominal size of the fitting. Said one end of the fitting is contoured to engage the main pipe adjacent the periphery of the branch orifice, has a first beveled face at an angle of from about 30° to about 50° extending across a thickness of the fitting wall equal to from about 75% to about 125% of the wall thickness of a branch pipe of the same nominal size as the fitting and a second beveled face at an angle of from about 50° to about 75° extending outwardly from the first beveled face. The second beveled face will be at an angle at least 15° greater than the first beveled face. The width of each beveled face is substantially uniform throughout and the wall thickness of the fitting adjacent the beveled faces is uniform throughout.

DESCRIPTION OF PREFERRED EMBODIMENT

Figure 1:
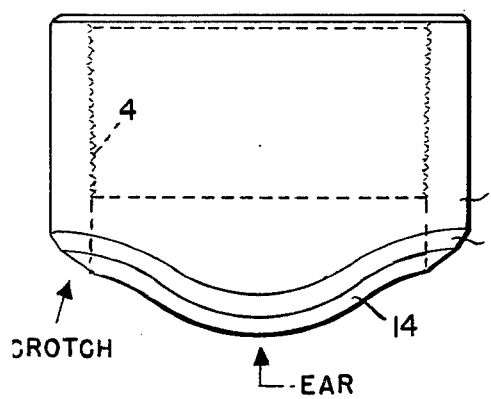
FIG. 1 is an elevation of a branch pipe connection fitting in accordance with the invention.

A branch pipe connection fitting 2 has a cylindrical wall 3 provided with threads 4 for the connection of a branch pipe (not shown). Branch pipe fittings are designated by the nominal size of the branch pipe. Thus, if a 1 inch nominal branch pipe is to be employed, the fitting 2 would be designated as a 1 inch fitting. It will be obvious that the fittings of the invention are useful irrespective of the means for connecting the branch pipe to the fitting, other typical connections being shown, for example, in U.S. Pat. No. 3,516,692 which is incorporated herein by reference.

Fitting 2 is contoured to engage a main pipe 6 adjacent the periphery of a branch orifice 8 in the main pipe 6. The fitting 2 will have a wall thickness at least equal to the wall thickness of a branch pipe of a nominal size which is the same as the nominal size of the fitting. Advantageously, the wall thickness of the fitting will be from 100% to about 300% of the wall thickness of a branch pipe of a nominal size which is the same as the nominal size of the fitting.

Fitting 2 has a conventional flat 12 extending outwardly from the interior surface of the fitting, a first beveled face 14 extending outwardly from flat 12 and a second beveled face 16 extending outwardly from beveled face 14 to the outer surface of the fitting. The flat 12 is not essential but when used will advantageously be from about 1/32 to about 3/32 inch. Beveled face 14 extends across a thickness of fitting wall 3 equal to from about 75% to about 125% of the thickness of the wall of branch pipe of the same nominal size as the fitting.

Figure 4:
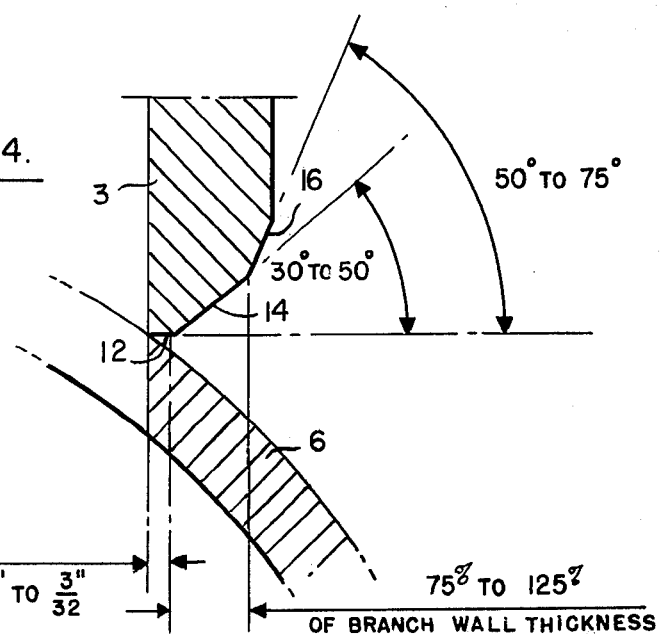
FIG. 4 is an enlarged view of a portion of the structure shown in FIG. 3.
Figure 2:
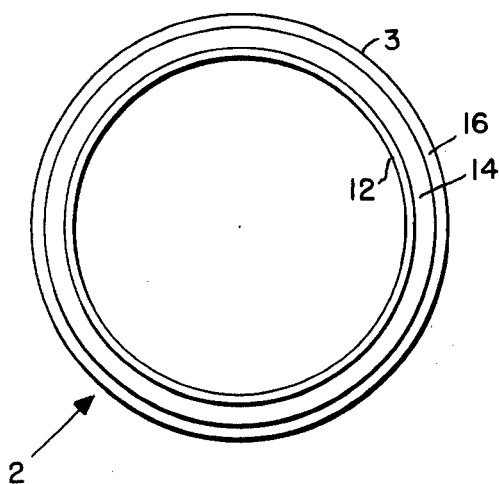
FIG. 2 is a bottom plan view of the fitting of FIG. 1.

Beveled face 14 is at an angle of from about 30° to about 50° and beveled face 16 is at an angle of from about 50° to about 75°. As is conventional, these angles are measured in a plane containing the axis of the fitting between the beveled face in question and a line in said plane which is perpendicular to the axis of the fitting and which passes through flat 12 (see FIG. 4). The widths of flat 12, beveled face 14, and beveled face 16 and their angular relationships is uniform throughout the fitting.

Advantageously the length of the fitting measured from the crotch to the discharge end (see L in FIG. 3) is a minimum of 0.4 times the fitting inner diameter (see D in FIG. 3) plus the length necessary for the threads or other attachment means.

Figure 3:
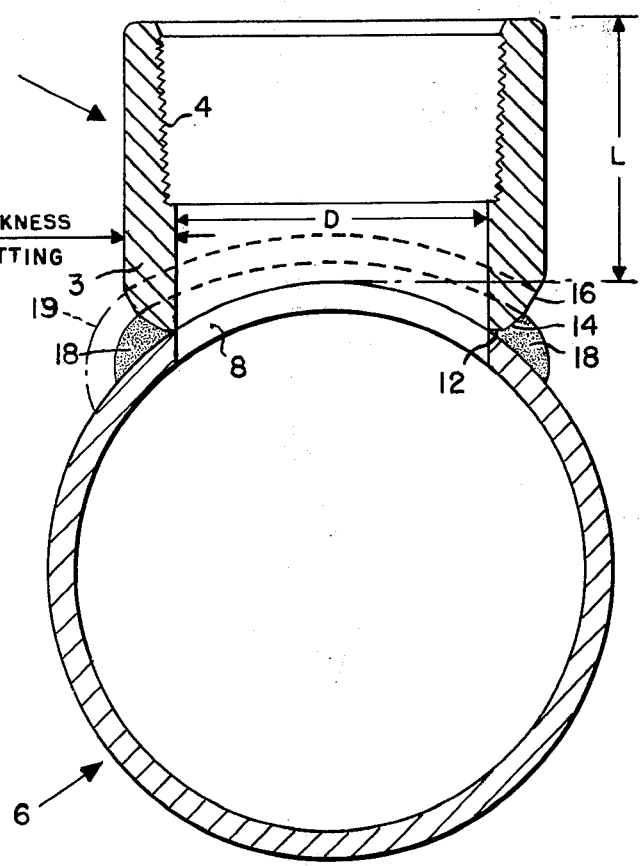
FIG. 3 is a vertical section through the fitting of FIG. 1 welded to a main pipe.

Fitting 2 is secured to pipe 6 by a weld indicated at 18, the weld extending from pipe 6 to the line between beveled faces 14 and 16, this line giving an accurate indication to the welder exactly how far out the weld is to be carried. Furthermore, by extending the weld from pipe 6 to a line between the second beveled face and the outer diameter of the fitting as shown in phantom at 19 results in a clearly defined accurate indication to the welder exactly how far out the weld is to be carried for use with the next higher schedule pipe. As is seen in FIG. 3, the angle of beveled face 16 substantially eliminates stress intensification at the joint between the outer portion of weld 18 and wall 3 of fitting 2 by eliminating a notch in the pipe joint.

I claim:

1. A cylindrical branch pipe connection fitting having one end adapted to be welded to a substantially round main pipe at a branch orifice in said main pipe and the other end adapted to be connected to a branch pipe, said one end of the fitting being contoured with ear portions and crotch portions in different planes to engage the main pipe adjacent the periphery of the branch orifice, and said one end of the fitting having a first beveled face at an angle of from about 30° to about 50° extending across a thickness of the fitting wall equal to from about 75% to about 125% of the wall thickness of a branch pipe of the same nominal size as the nominal size of the fitting, the width of the first beveled face being substantially uniform throughout, and a second beveled face at an angle of from about 50° to about 75° extending outwardly from the first beveled face, the second beveled face being at an angle at least 15° greater than the first beveled face and the width of the second beveled face being substantially uniform throughout.

2. A fitting in accordance with claim 1 in which the wall thickness of the fitting adjacent the beveled faces is substantially uniform throughout.

3. A cylindrical branch pipe connection fitting having one end adapted to be welded to a substantially round main pipe at a branch orifice in said main pipe and the other end adapted to be connected to a branch pipe, said one end of the fitting being contoured with ear portions and crotch portions in different planes to engage the main pipe adjacent the periphery of the branch orifice, and said one end of the fitting having a first beveled face at an angle of from about 30° to about 50°, the width of the first beveled face being substantially uniform throughout, and a second beveled face at an angle of from about 50° to about 75° extending outwardly from the first beveled face, the second beveled face being at an angle at least 15° greater than the first beveled face and the width of the second beveled face being substantially uniform throughout.

* * * * *